UNITED STATES PATENT OFFICE 2,046,876

PREPARATION OF DIARYL DITHIOCARBAMATES

Paul C. Jones, Cuyahoga Falls, Ohio, assignor to The B. F. Goodrich Company, New York, N. Y., a corporation of New York No Drawing. Application August 16, 1935, Serial No. 36,554

10 Claims. (Cl. 260—109)

This invention relates to the preparation of N-diaryl dithiocarbamates. Salts of diaryl dithiocarbamic acids have heretofore been produced by the addition of carbon disulphide to certain metal compounds of diarylamines, particularly the sodium compound. These metal compounds are not only hard and intractable, so that effective contact with the carbon disulphide is somewhat difficult to attain, but are exceedingly reactive and decompose rapidly or even ignite spontaneously when in contact with the air. The chief object of this invention is to provide a new method for making diaryl dithiocarbamates which method permits easy handling of the intermediate highly reactive organic metal compounds.

In the process of this invention the diarylamine is reacted with the metal in a solvent consisting largely or wholly of liquid, anhydrous ammonia. The metal compounds of the amines are exceedingly soluble in ammonia, and they are readily and rapidly produced, even at the low temperature of liquid ammonia at atmospheric pressure, by the direct reaction of the metal and the diarylamine in accordance with the equation $$R_2NH + M \rightarrow R_2NM + H$$

where R represents an aryl group and M represents an atom of a monovalent metal or a half atom of a bivalent metal. In those cases in which the nascent hydrogen produced in this reaction would tend to reduce the amine, the metal may be permitted to react first with the ammonia to produce the corresponding metal amide and the amine may then be added, whereupon the metal compound of the amine will be formed and the ammonia regenerated. In either modification of this process the metal compound of the diarylamine is produced as a concentrated solution in ammonia and in a state of almost perfect purity.

Since carbon disulphide reacts with ammonia, it is necessary to eliminate at least the major part of the ammonia used as a solvent before the intermediate metal compound is reacted with the carbon disulphide. This is accomplished, without exposing the highly reactive metal compound to the air, by introducing into the ammonia solution an inert liquid of low freezing point such as ether, petroleum ether or toluene. The heat carried by the added liquid causes the ammonia to boil away rapidly, leaving the intermediate metal compound in a state of fine suspension in the inert liquid, in which it is insoluble. Thereupon carbon disulphide is added and immediately undergoes the desired reaction with the metal compound to form the desired dithiocarbamate.

$$R_2NM + CS_2 \rightarrow R_2N-CS-SM$$

The diarylamines used in this process may be either simple unsubstituted diarylamines such as diphenylamine, phenyl tolylamine, phenyl cumyl amine, phenyl xenyl amine, phenyl naphthylamine, phenyl anthracyl amine, ditolylamine, dixenylamine, dinaphthylamine, phenyl ar-tetrahydronaphthyl amine, di(ar-tetrahydronaphthyl) amine, or amines containing substituents such as halogen, nitro, alkoxy, aryloxy, or secondary or tertiary amino groups, or even heterocyclic amines in which a secondary amino nitrogen is attached to two aromatic rings such as carbazole, o-imino dibenzyl, meso meso dimethyl acridane, etc. If substituted amines are employed, the substituents and the conditions of the reaction should be so chosen as not to interfere with the reaction. For example, nitro substituted amines may be reacted with a metal amide as suggested above instead of with a free metal, in order to avoid reduction of the nitro group. Additional secondary amino groups will generally participate in the reaction, giving compounds containing two or more dithiocarbamic groups. It is to be understood that the term diarylamine, unless otherwise limited, is herein employed in a generic sense to embrace all the diarylamines and their derivatives and equivalents enumerated above.

The metals employed are those which are highly reactive toward organic compounds, preferably metals having a positive electrode potential (relative to hydrogen) greater than two volts, that is, alkali or alkaline earth metals (including magnesium). Sodium is ordinarily preferred, because it is readily available in the metallic state at a very low price, readily undergoes the desired reactions, and produces water soluble dithiocarbamates from which the salts of less reactive metals may readily be produced by double decomposition.

As a specific example of one embodiment of the invention, a covered kettle is charged with 405 parts by weight of liquid, anhydrous ammonia at atmospheric pressure and 211 parts of powdered diphenylamine (a 25% excess over the quantity required for the reaction) are added. 23 parts of metallic sodium are added gradually. When the deep blue color characteristic of metallic sodium dissolved in ammonia disappears, this stage of the reaction is complete. 1700 parts of toluene are added slowly, whereupon the ammonia rapidly boils off and the contents of the kettle warm up from their previous temperature of about −30° C. to about 0°. The kettle at this point contains the sodium compound of diphenylamine in a state of great purity, finely suspended in toluene in which is dissolved the excess diphenylamine together with some residual ammonia. A mixture of 125 parts of carbon disulphide (a large excess over that required for the reaction) and 700 parts of toluene is now added. The carbon disulphide reacts rapidly with the finely divided metal compound, converting it quantitatively to the sodium salt of diphenyl dithiocarbamic acid, which being insoluble in toluene, remains in suspension. The heat of reaction causes the mixture to warm to about 70–80° C. The product is filtered off and washed with a small quantity of toluene. It is of sufficient purity for most purposes, but if desired may be further purified by crystallization from water or alcohol. If an especially pure product is desired, the toluene suspension may be warmed or even boiled for a short time, to eliminate all the ammonia before the carbon disulphide is added.

The ammonia may readily be recovered by absorption or by recompression to the liquid state. Vapors of carbon disulphide and toluene given off during the latter stage of the reaction may be condensed and added to the mother liquor remaining at the end of the process. The combined liquors are then readily separated by distillation into their constitutents—carbon disulphide, toluene and unreacted diphenylamine, each of which may be reused in a subsequent batch.

The proportions of the reagent used are subject to considerable variation. The diarylamine should be used in at least equivalent proportions in order to avoid the presence at the end of the reaction of any unreacted free metal (or metal amide). The use of an excess of amine greatly expedites the first stage of the reaction, but can be avoided if more time is allowed or if the quantity of solvent (ammonia) is increased. A certain excess of carbon disulphide should always be used, beceause some loss of this extremely volatile compound is almost unavoidable, and because a deficiency of carbon disulphide would permit some of the metal compound of the diarylamine to remain unreacted, which would contaminate the product and introduce a considerable fire hazard. It is not necessary to dilute the carbon disulphide, but the strongly exothermal reaction is more easily controlled if it is somewhat diluted, preferably with the same inert liquid already present in the reaction mixture.

Other diaryl dithiocarbamates within the scope of this invention may be prepared in a similar manner with such changes in proportions and reaction conditions as will be obvious to any skilled chemist.

I claim:

1. The method of making a diaryl dithiocarbamate which comprises preparing a solution in liquid ammonia of a metal compound of a diarylamine in which the metal is directly attached to the amino nitrogen of the diarylamine, replacing the ammonia by an inert liquid, and adding carbon disulphide.

2. The method of making a diaryl dithiocarbamate which comprises preparing a solution in liquid ammonia of a compound of a diarylamine and a metal with an electrode potential greater than two in which the metal is directly attached to the amino nitrogen of the diarylamine, displacing the ammonia by an inert liquid in which the metal compound is insoluble, and adding carbon disulphide.

3. The method of making a diaryl dithiocarbamate which comprises preparing a solution in liquid ammonia of an alkali metal compound of a diarylamine in which the metal is directly attached to the amino nitrogen of the diarylamine, displacing the ammonia by an inert liquid in which the metal compound is insoluble, and adding carbon disulphide.

4. The method of making a diaryl dithiocarbamate which comprises preparing a solution in liquid ammonia of a sodium compound of a diarylamine in which the sodium is directly attached to the amino nitrogen of the diarylamine, displacing the ammonia by an inert liquid in which the sodium compound is insoluble, and adding carbon disulphide.

5. The method of making a diaryl dithiocarbamate which comprises preparing a solution of a sodium compound of a di(hydrocarbon aryl) amine in liquid ammonia, displacing the ammonia by an inert liquid, and adding carbon disulphide.

6. The method of making a diaryl dithiocarbamate which comprises preparing a solution of a sodium compound of a di(hydrocarbon aryl) amine in liquid ammonia, displacing the ammonia by an inert liquid hydrocarbon, and adding carbon disulphide.

7. The method of making a diphenyl dithiocarbamate which comprises preparing a solution of the sodium compound of diphenylamine in liquid ammonia, displacing the ammonia by an inert liquid hydrocarbon, and adding carbon disulphide.

8. The method of making a diaryl dithiocarbamate which comprises adding an alkali metal and a diarylamine to liquid ammonia to form a solution in liquid ammonia of a compound in which the metal is directly attached to the amino nitrogen of the diarylamine, displacing the ammonia by an inert liquid, and adding carbon disulphide.

9. The method of making sodium diphenyl dithiocarbamate which comprises dissolving sodium and diphenylamine in liquid ammonia to form a solution of the sodium compound of diphenylamine, displacing the ammonia by an inert liquid, and adding carbon disulphide.

10. The method of making sodium diphenyl dithiocarbamate which comprises adding diphenylamine to a solution of less than an equivalent quantity of sodium in liquid ammonia, after the blue sodium color disappears displacing the ammonia by an inert liquid hydrocarbon, and adding carbon disulphide.

PAUL C. JONES.